(12) United States Patent
Turner et al.

(10) Patent No.: US 8,646,111 B2
(45) Date of Patent: Feb. 4, 2014

(54) COUPLED MASS-SPRING SYSTEMS AND IMAGING METHODS FOR SCANNING PROBE MICROSCOPY

(75) Inventors: Kimberly L. Turner, Goleta, CA (US); Benedikt Zeyen, Moenkeberg (DE)

(73) Assignee: The Regents of the University of California, Oakland, CA (US)

( * ) Notice: Subject to any disclaimer, the term of this patent is extended or adjusted under 35 U.S.C. 154(b) by 404 days.

(21) Appl. No.: 12/223,891

(22) PCT Filed: Feb. 13, 2007

(86) PCT No.: PCT/US2007/004126
§ 371 (c)(1),
(2), (4) Date: Jun. 8, 2010

(87) PCT Pub. No.: WO2007/095360
PCT Pub. Date: Aug. 23, 2007

(65) Prior Publication Data
US 2010/0257644 A1    Oct. 7, 2010

Related U.S. Application Data

(60) Provisional application No. 60/773,179, filed on Feb. 14, 2006.

(51) Int. Cl.
*G01Q 30/00* (2010.01)
(52) U.S. Cl.
USPC .......... 850/8; 850/1; 850/33; 850/40; 850/56; 850/63
(58) Field of Classification Search
USPC ...................................... 850/1–63
See application file for complete search history.

(56) References Cited

U.S. PATENT DOCUMENTS

| 174,465 A |  | 3/1876 | Bell |
|---|---|---|---|
| 2,066,463 A |  | 1/1937 | Finch |
| 2,743,614 A |  | 5/1956 | Cecil |
| 5,216,631 A | * | 6/1993 | Sliwa, Jr. ...................... 365/174 |
| 5,338,932 A | * | 8/1994 | Theodore et al. ................. 850/1 |
| 5,801,472 A | * | 9/1998 | Wada et al. ................... 310/309 |
| 5,804,709 A | * | 9/1998 | Bourgoin et al. ............... 73/105 |
| 5,902,928 A | * | 5/1999 | Chen et al. ........................ 850/7 |

(Continued)

OTHER PUBLICATIONS

M. Balantekin, A. Atalar: "Enhancing Higher Harmonics of a Tapping Cantilever by Excitation at a Submultiple of its Resonance Frequency," Physical Review B71, 125416 (2005).*

(Continued)

*Primary Examiner* — David A Vanore
*Assistant Examiner* — Wyatt Stoffa
(74) *Attorney, Agent, or Firm* — Berliner & Associates

(57) ABSTRACT

A novel way for constructing and operating scanning probe microscopes to dynamically measure material properties of samples, mainly their surface hardness, by separating the functions of actuation, indentation and sensing into separate dynamic components. The amplitude and phase shift of higher modes occurring at periodic indentations with the sample are characteristic values for different sample materials. A separate sensor cantilever, connected to the indentation probe tip, has the advantage of a high mechanical amplification of a desired higher mode while suppressing the actuation signal itself. The operational range of the sensor can be extended just by switching the actuation signal to another submultiple of the sensor cantilever's resonance frequency and/or by using more than one sensor cantilever for each indentation tip.

33 Claims, 10 Drawing Sheets

(56) References Cited

U.S. PATENT DOCUMENTS

| | | | | |
|---|---|---|---|---|
| 5,965,885 | A * | 10/1999 | Inoue | 850/1 |
| 6,028,305 | A * | 2/2000 | Minne et al. | 250/234 |
| 6,079,255 | A * | 6/2000 | Binnig et al. | 73/105 |
| 6,229,609 | B1 * | 5/2001 | Muramatsu et al. | 356/601 |
| 6,237,399 | B1 * | 5/2001 | Shivaram et al. | 850/46 |
| 6,240,771 | B1 * | 6/2001 | Giessibl | 73/105 |
| 6,249,000 | B1 * | 6/2001 | Muramatsu et al. | 850/7 |
| 6,452,161 | B1 * | 9/2002 | Yedur et al. | 250/234 |
| 6,611,140 | B1 * | 8/2003 | Bloechl et al. | 324/207.21 |
| 6,667,467 | B2 * | 12/2003 | Shimizu et al. | 250/201.3 |
| 6,734,425 | B2 * | 5/2004 | Hantschel et al. | 850/1 |
| 6,900,575 | B2 * | 5/2005 | Olkhovets et al. | 310/309 |
| 6,995,368 | B2 * | 2/2006 | Wen et al. | 250/306 |
| 7,268,348 | B2 * | 9/2007 | Binning et al. | 250/306 |
| 7,340,944 | B2 * | 3/2008 | Beyder et al. | 73/105 |
| 7,533,561 | B2 * | 5/2009 | Beyder et al. | 73/105 |
| 7,610,797 | B2 * | 11/2009 | Mancevski | 73/105 |
| 7,748,260 | B2 * | 7/2010 | Su et al. | 73/105 |
| 7,849,516 | B2 * | 12/2010 | Binnig et al. | 850/62 |
| 7,973,280 | B2 * | 7/2011 | Takahashi et al. | 250/307 |
| 7,979,916 | B2 * | 7/2011 | Pittenger et al. | 850/6 |
| 2002/0167375 | A1 | 11/2002 | Hoppe et al. | |
| 2004/0206165 | A1 * | 10/2004 | Minne et al. | 73/105 |
| 2004/0218507 | A1 * | 11/2004 | Binnig et al. | 369/154 |
| 2005/0073078 | A1 | 4/2005 | Lutz et al. | |
| 2005/0092907 | A1 * | 5/2005 | West et al. | 250/234 |
| 2005/0099895 | A1 * | 5/2005 | Maeda et al. | 369/13.01 |
| 2005/0121615 | A1 | 6/2005 | Prater et al. | |
| 2005/0199047 | A1 * | 9/2005 | Adams et al. | 73/105 |
| 2006/0005614 | A1 | 1/2006 | Sahin et al. | |
| 2006/0255818 | A1 * | 11/2006 | Altmann et al. | 324/754 |
| 2009/0070904 | A1 * | 3/2009 | West et al. | 850/5 |
| 2009/0320167 | A1 * | 12/2009 | Kobayashi et al. | 850/40 |
| 2010/0257644 | A1 * | 10/2010 | Turner et al. | 850/8 |
| 2010/0306885 | A1 * | 12/2010 | Degertekin | 850/7 |
| 2011/0113517 | A1 * | 5/2011 | Duerig et al. | 850/56 |
| 2013/0087723 | A1 * | 4/2013 | Pelletier et al. | 250/504 R |

OTHER PUBLICATIONS

G. Binnig, C.F. Quate, Ch. Gerber: *Atomic Force Microscopy*, Physical Review Letters, vol. 56, No. 9, pp. 930 (1986).

J. Tamayo, R. Garcia: Deformation, Contact Time, and Phase Contrast in Tapping Mode Scanning Force Microscopy, Langmuir 12, pp. 4430 (1996).

E.K. Dimitriadis, F. Horkay, J. Maresca, B. Kachar, R.S. Chadwick: *Determination of Elastic Moduli of Thin Layers of Soft Material Using the Atomic Force Microscope*, Biophysical Journal, vol. 82, pp. 2798 (2002).

O. Sahin, C.F. Quate, O. Solgaard, A. Atalar: *Resonant Harmonic Response in Tapping-Mode Atomic Force Microscopy*, Physical Review B69, 165416 (2004). See also, U.S. Patent No. 6,935,167 to Sahlin et al. Titled: *Harmonic Cantilevers and Imaging methods for Atomic Force Microscopy*.

M. Balantekin, A. Atalar: Enhancing Higher Harmonics of a Tapping Cantilever by Excitation at a Submultiple of its Resonance Frequency, Physical Review B71, 125416 (2005).

R Bashir, A. Gupta, GW Neudeck, M McElfresh, R Gomez: On the Design of Piezoresistive Silicon Cantilevers with Stress Concentration Regions for Scanning Probe Microscopy Applications, J. Micromech Microeng. vol. 10, pp. 483 (2000).

R. Baskaran, K.L. Turner: *Mechanical Domain Non-Degenerate Parametric Resonance in Torsional Mode Micro Electro Mechanical Oscillator*, Transducers '03, Boston, pp. 863 (2003).

O. Sahin, G. Yaralioglu, R. Grow, S.F. Zappe, A. Atalar, C. Quate, O. Solgaard: *High-Resolution Imaging of Elastic Properties Using Harmonic Cantilevers*, Sensors and Actuators a 114, pp. 183 (2004).

* cited by examiner

COUPLED MASS-SPRING SYSTEMS AND IMAGING METHODS FOR SCANNING PROBE MICROSCOPY

CROSS-REFERENCE TO RELATED APPLICATIONS

This application claims the benefit of Provisional Patent Application No. 60/773,179, filed Feb. 14, 2006

FIELD OF THE INVENTION

The invention relates to cantilevers and imaging methods for use in atomic force microscopy and, in particular, to a scanning probe cantilever and imaging methods using the cantilever for imaging at higher harmonic modes of the excitation frequency in tapping mode atomic force microscopy.

BACKGROUND OF THE INVENTION

The atomic force microscopy was described for the first time in 1986 by G. Binning et al. [1]. This method, where samples are examined with an atomically sharp tip (typically around 20 nm diameter at the tip) allows atomic resolution for topography measurements and atomic manipulation capability. Together with the topography, more properties of the samples can be extracted [2] with the atomic force microscopy, either statically with the Nanoindenter or dynamically by using the microscope in tapping mode [3].

Recent research focuses on the study of higher harmonics of the response [4] of an atomic force microscope in tapping mode, which change characteristically with respect to the Youngs Modulus of the sample. Higher harmonics are excited more with harder materials. These higher harmonics can be mechanically preamplified with an appropriate construction [12] or excitation [6] of the system and be read out with the usual optical measurement units. Subject to research is also the use of other measurement methods like piezoresistive cantilevers [7], which are directly included in the system and allow a "system on a chip"; or capacitative methods [8], which could lead to cheap mass-producible solutions.

As the capability for engineering nanoscale materials improves, so does the need for measuring and quantifying the properties of these materials. Due to manufacturing processes, or even the material structure, mechanical and electrical properties can change quite significantly over a device or sample. Therefore it is not sufficient to merely probe the pre-processed material in a spot and assume that the material properties will be constant over the sample. A way to probe specific areas on the specimen and measure material properties without damaging the material, and with nanometer-scale spatial precision would be very helpful.

BRIEF SUMMARY OF THE INVENTION

This invention improves the capability of scanning probe microscopes by using a separate second sensor resonator to preamplify higher harmonics occurring at periodic indentation of sample materials. This separation leads to a higher performance and higher versatility of the scanning probe microscope over a wide range of different sample materials. Also aspects of on-chip sensing become practical with this invention.

The main embodiment of this invention consists of two coupled micromechanical mass-spring systems, consisting of two cantilever arms with one fixed and one free end each. These two cantilever arms are connected to each other for energy transfer. One of these cantilever arms is called the actuator cantilever, the other one the sensor cantilever. A probe tip projects from the free end of the actuator cantilever. This system allows the amplification of a desired higher harmonic frequency and a suppression of the excitation frequency.

One can use any means for coupling the cantilever arms. Thus, one can use a mechanical coupling spring to transfer energy between the actuation/indentation oscillator and the sensor oscillator. Alternatively, one can use electrostatic coupling between the actuation/indentation oscillator and the sensor oscillator for the energy transfer by incorporating an electric bias between the two oscillators. Still alternatively, one can use magnetic coupling between the actuation/indentation oscillator and the sensor oscillator for the energy transfer by applying a thin magnetic layer to each of the two oscillators.

In a specific embodiment, the actuator cantilever is excited at a certain submultiple of the resonant frequency of the sensor cantilever. When using this embodiment as a scanning probe microscope in tapping mode, the nonlinear interaction forces between the probe tip and the sample cause small periodic changes in the trajectory of the actuator cantilever. These periodic changes can be expressed in a Fourier series, where a certain higher harmonic of the excitation frequency is mechanically amplified and the excitation frequency itself is suppressed by the sensor cantilever.

In a specific embodiment, the invention consists of two coupled cantilever arms, where an actuation cantilever is fixed on one side and has the probe tip projecting on the other side and where a sensor cantilever is coupled to the actuation cantilever close to the probe tip and has a free end on its other side.

In another specific embodiment of the invention the mass-spring system has a fixed and the coupling cantilever as a free end, to which is coupled an actuation cantilever with the probe tip on its other side and the sensor cantilever with a free end.

Another embodiment of this invention consists of an actuation cantilever with a second mass-spring indentation cantilever. In this embodiment the functions of actuation and indentation are separated. The actuation force is applied on the actuation cantilever, and the probe tip projects from the other side of the indentation cantilever. In one embodiment one or more sensor cantilevers are directly attached to the indentation cantilever, in another embodiment the sensor cantilevers have one fixed end and one free end and are coupled to the probe tip side of the indentation cantilever. In this embodiment, the indentation cantilever has a much higher resonant frequency than all other cantilevers in this embodiment, therefore allowing a trajectory change due to the non-linear indentation of the probe tip into the sample surface. In a variation of this embodiment, a single actuation cantilever is used for more than one indentation mass-spring system. With this single actuation cantilever, an easy synchronization of an array of sensors can be achieved.

In another embodiment, the resonance frequency of the actuator cantilever is tuned far away from any possible resonance from the excitation frequency to allow high actuation and indentation forces and greater fabrication tolerances. In another embodiment, the resonance frequency of the actuator cantilever is tuned close to the excitation frequency to allow low actuation and indentation forces.

In a specific embodiment, the actuator cantilever is comprised of a silicon substrate, a metallic electrode, a piezoelectric layer and another metallic electrode. The dynamic properties of the actuator cantilever can be tuned by changing the layer thicknesses.

In still another specific embodiment, the movement of the sensor cantilever can be monitored in a regular atomic force microscope by laser reflectance on its back side.

In still another specific embodiment, the sensor cantilever is comprised of a silicon substrate, a metallic electrode, a piezoelectric layer and another metallic electrode, giving it the ability to monitor the movement of the sensor cantilever alone directly on the chip, even when the sensor cantilever is attached to the actuator cantilever. The dynamic properties of the sensor cantilever can be tuned by changing the layer thicknesses.

In still another specific embodiment, the sensor cantilever is comprised of a piezoresistive material, giving it the ability to monitor the movement of the sensor cantilever directly on the chip with the same advantages as the embodiment with the piezoelectric sensor cantilever.

In still another specific embodiment, the cantilever arms have a mass attached at the free end for tuning reasons. This amount of mass can be influenced during fabrication with a separate mask.

In still another specific embodiment, where the excitation frequency is not equal to the resonance frequency of the actuator cantilever, the higher harmonic to be amplified can be changed just by changing the excitation frequency to a different submultiple of the resonance frequency of the sensor cantilever.

BRIEF DESCRIPTIONS OF THE DRAWINGS

FIG. 1 describes the lumped mass model for the function of the preferred embodiment;

FIG. 2 describes the lumped mass model for the function of another embodiment;

FIG. 3 describes the lumped mass model for the function of a third embodiment;

FIG. 4 describes the lumped mass model for the function of yet another embodiment;

Figure 13:
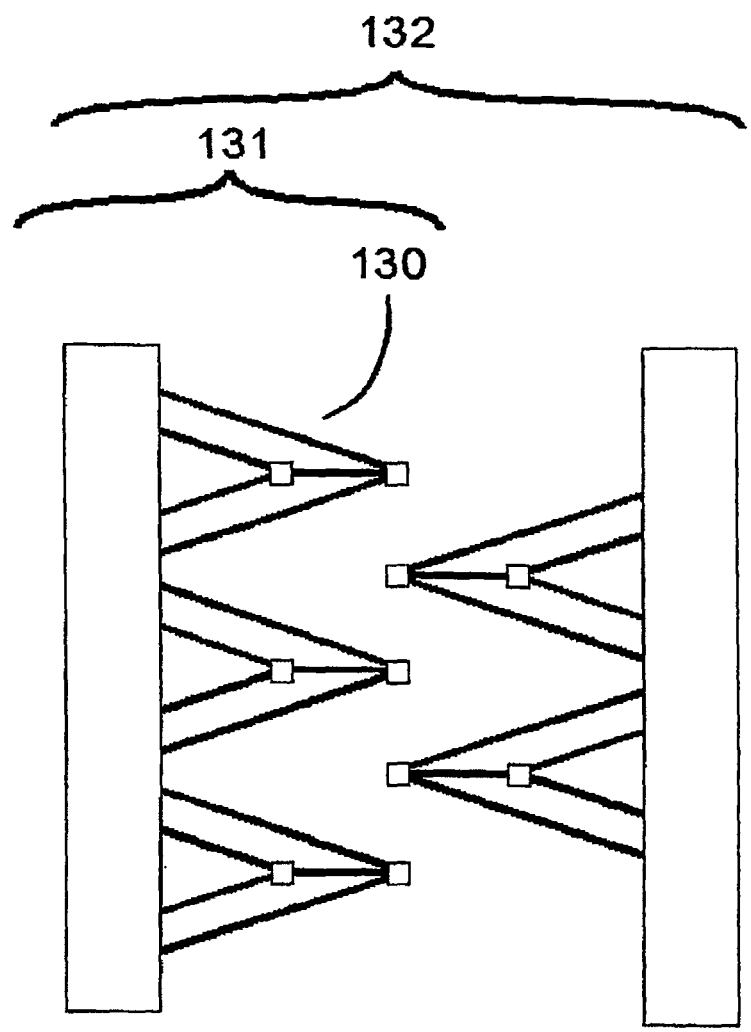
Figure 14:
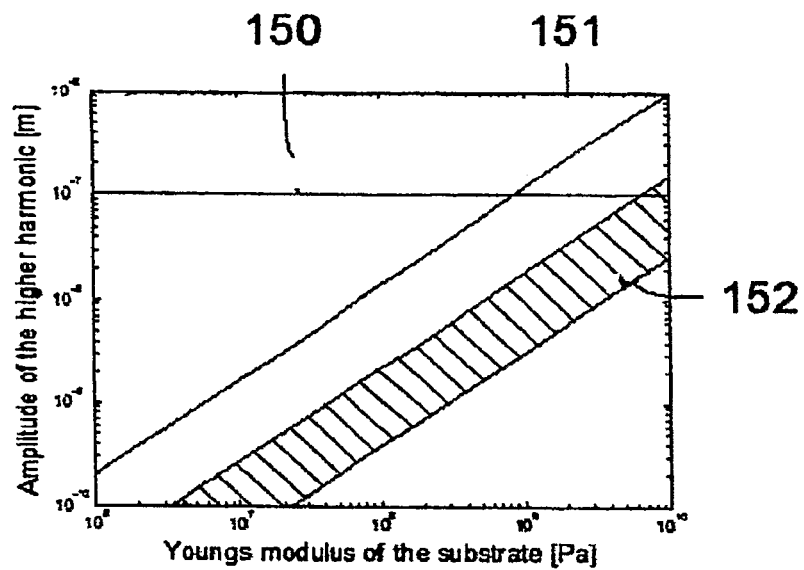

FIG. 13 describes the alignment and wiring options for lines and arrays of sensors; and FIG. 14 shows the calculated performance of the preferred embodiment.

DETAILED DESCRIPTION OF THE INVENTION

The invention provides a coupled mass-spring system for use as a scanning probe microscope, and method of using it. In general terms, the system comprises one or more oscillators including an actuator oscillator, a probe on one of the oscillators for contacting a sample, and a sensor oscillator spaced from the probe-bearing oscillator and coupled to the probe-bearing oscillator for transfer of energy between the sensor oscillator and the probe-bearing oscillator. This arrangement of components enables mechanical amplification of a desired frequency in the sensor oscillator to improve the sensitivity and measurement range of the scanning probe microscope. In an embodiment of the invention, the probe-bearing oscillator is an indentation oscillator. In another embodiment of the invention, the probe-bearing oscillator is the actuator, which serves as an actuator/indentation oscillator.

The sensor oscillator and the probe-bearing oscillator can be coupled by any appropriate arrangement. For example, they can be coupled by a mechanical spring, or they can be electrostatically coupled, or magnetically coupled. If they are to be electrostatically coupled, electrodes can be applied to the sensor oscillator and the probe-hearing oscillator and connected to an electric current to provide the electrostatic coupling. Electrodes can be applied by a metallisation and lift-off process on top of the cantilevers.

If the sensor oscillator and the probe-bearing oscillator are electromagnetically coupled a magnetic coating can be applied to either the sensor oscillator or the probe-bearing oscillator and an electrode is applied to the other oscillator and connected to an electric current to provide electromagnetic coupling. Electrodes can be applied by a metallisation and lift-off process on top of the cantilevers. Permanent magnetic layers can be deposited on the cantilevers by electrodeposition and a subsequent reactive ion etch.

If the sensor oscillator and the probe-bearing oscillator are magnetically coupled, magnetic coatings of opposite polarity can be applied on confronting surfaces of the oscillators. Permanent magnetic layers can be deposited on the surfaces by electrodeposition and a subsequent reactive ion etch.

In a particular embodiment, the probe-bearing oscillator has a free and a fixed end with the tip of the probe projecting near the free end thereof, and the sensing oscillator has a free and a fixed end. In another particular embodiment of the invention, the fixed end of the sensing oscillator is on the fixed end of the probe-bearing oscillator.

In an embodiment of the invention, the coupling mass spring system is on a chip and realized by an etch undercut for higher quality factors, and/or realized by a torsional spring for higher quality factors.

In a particular embodiment of the invention, the actuation oscillator has a fixed end and an actuated displacement controlled free end. The probe-bearing oscillator is an indentation oscillator with one end at the actuation oscillator's free end and one free end, with the tip of the probe projecting at the free end to allow an elastic reaction to a tip-surface contact. In one form of this embodiment, the sensing oscillator has a fixed end and the other end at the indentation oscillator, mechanically amplifying one or more higher harmonics of the actuation frequency. There can be more than one indentation oscillators, the actuation oscillator serving as the actuation source each indentation oscillator. In another form of this embodiment, the sensing oscillator has one end on the probe end of the indentation oscillator, a free end of the sensing oscillator mechanically amplifying one or more higher harmonics of the actuation frequency. In a specific embodiment, the sensor spring comprises a torsional spring for low damping.

The coupled mass-spring system can comprise a material selected from the group of silicon, silicon nitride, titanium. The actuator oscillator can form a bimorph containing two materials with a highly different piezoelectric constant and two electrodes on the top and the bottom serving as a piezoelectric drive, or as a piezoelectric on-chip sensor, or a bimorph containing a substrate, an electrode, a piezoelectric layer and another electrode. The resonant frequency of the sensor oscillator can be tuned without changing the mask geometry in accordance with the layer thickness of the bimorph.

The coupled system can be embedded in a line of sensors or as an array of sensors, with independent actuators and on-chip sensors. When the components are embedded in a line of sensors, the sensor oscillator is periodically actuated and the system is aligned by lowering the periodically actuated sensor until a first contact is established and lowering a point on the other side of the sensor line while maintaining the position of the first point of contact until a contact of the line of sensors is established.

When the components are embedded as an array of sensors, the system can be aligned in two directions of tilting by lowering the periodically actuated sensor until a first contact has been established, then lowering a second point on one other side of the sensor array while maintaining the position of the first point of contact until a line of contacts has been established and then by lowering a third point on yet another side of the sensor array while maintaining the position of the first line of contact until an area of contacts has been established.

In an embodiment of the invention, the actuation oscillator is actuatable at a submultiple of one of the sensing oscillator's resonant frequencies. In another embodiment of the invention, the sensor oscillator is tunable to integer multiples of the actuation frequency to mechanically amplify one or more higher harmonics of the actuation frequency. In one embodiment, the actuation oscillator is tuned and driven at or close to one of its resonant frequencies. In another embodiment, the actuation oscillator is driven at a frequency that is not one of its resonant frequency, therefore requiring more actuation force to achieve the same amplitude and therefore providing higher indentation forces and higher robustness against fabrication tolerances.

Basic Function

Figure 1:
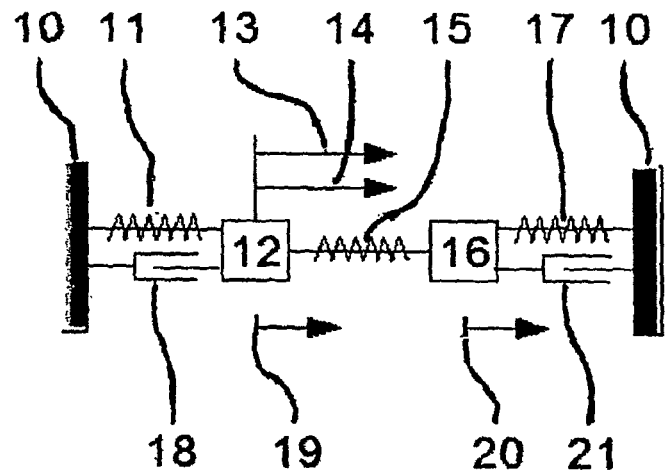

The function of the preferred embodiment of this invention is summarized in FIG. 1. The actuation cantilever can be modelled as a damped 18 mass 12 spring 11 system with a fixed end 10 and a free end 12. This cantilever is excited by the periodic actuation force 13, which is not necessarily its resonant frequency. Additionally, the tip-sample interaction occurs at mass 12, which can also be modelled as a periodic force 14. This force usually ranges in the high order of nano Newtons to low micro Newtons depending on the sharpness of the tip and the indentation depth. The movement of this dynamic system can be expressed with a time dependent coordinate 19. As the interaction forces are nonlinear and time dependent, the movement of the actuation cantilever is not only governed by the actuation signal but also by higher harmonics. The energy of the higher harmonics can be transferred by a coupling 15 to a damped 21 and tuned mass 16 spring 17 system as the sensor. The coupling 15 can be a mechanical spring or it can be an electrostatic or magnetic coupling. Its time dependent movement 20, caused by the excitation of the actuator system, amplifies mechanically the desired higher harmonic and, in most cases, suppresses the actuation signal.

This sensor is operated in high force tapping mode. This can be defined as an oscillatory movement of the probe with a periodic short elastic indentation of the sample with the probe tip. The tip-sample indentation forces during the indentation can be approximated with the Hertzian pressure $$F_p = \frac{4}{3} E \sqrt{r_t}\, x_d^{3/2}$$

where $F_p$ is the indentation force, E is the reduced Youngs modulus, $r_t$ is the tip radius, and $x_d$ is the indentation depth. Typical force values for 20 nm radius tip and 1 nm indentation depth in polymers are 10-100 nN.

OPERATIONAL ASPECTS OF THE INVENTION

Once in contact with a sample, the trajectory of the preferred embodiment changes its shape due to the additional indentation force. The amplitude of the actuation mass spring system is now no longer the amplitude of free oscillation but only a bit higher than twice the distance between the neutral position of the tip and the sample. After a few cycles, a new equilibrium develops, where the energy dissipation in the material, the dissipation due to damping, the actuation energy and the energy transfer to the sensor mass-spring system balance each other at the actuation frequency. For the actuation system and the sensor system, a higher damping coefficient is desirable for faster stabilization of a new equilibrium.

On the other hand, a high quality factor is desired for the sensor mass-spring system as more energy from the indentation mass can be accumulated during a number of actuation periods resulting in a higher excitation of the sensor mass spring system.

FIG. 14 summarizes the calculated performance of the preferred embodiment for different youngs moduli of the sample. The reaction of the sensor to the actuation signal is shown at 150. The third harmonic is shown at 151, on which the sensor is tuned. It can be seen that the amplitude of the third harmonic is highly dependent on the hardness of the substrate. Other higher harmonics can be found in the area shown at 152.

One critical process step in using an scanning probe microscope is the initial contact with the surface to avoid crashing the indentation tip into the sample surface in an uncontrolled manner. One very convenient way to detect a tip sample contact with this invention is the monitoring of the sensor when the actuator is actuated at a submultiple of the sensor's resonant frequency. As soon as the first contact is established, the sensor resonator will significantly start to oscillate, which can be sensed and interpreted as a contact.

In another embodiment of this invention, where more than one sensor is used in a line or array architecture, a first contact with the sample can be detected, when any of the sensor resonators starts to oscillate. The information about the position of the first sensor resonator being excited can be used to compensate the overall sensor for errors in tilt by lowering the opposite side of the first sensor resonator being excited and maintaining the position of the first.

Geometry of the Preferred Embodiments

Figure 5:
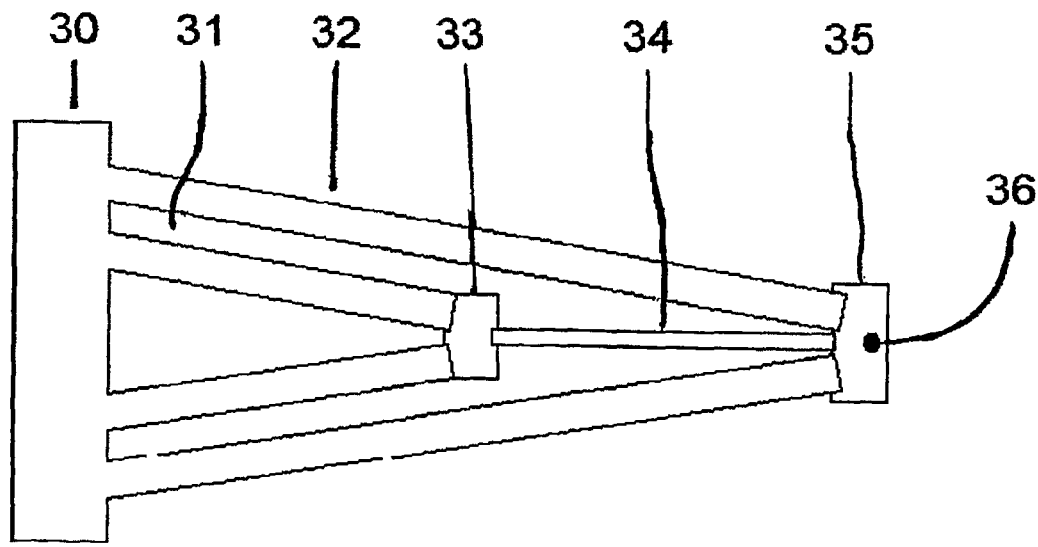
FIG. 5 illustrates an implementation in which the actuator and sensor arms are coupled by a mechanical spring.

One geometry of the preferred embodiment is described in FIG. 5. The actuator consists of one or more piezoelectric cantilever arms for actuation 32 and the actuation mass 35 including the atomically sharp indentation tip 36. The sensor mass spring system consists of one or more piezoelectric cantilever arms 31 for sensing and the sensor mass 33. Both mass spring systems are coupled, which in this embodiment is by a coupling spring 34. Both cantilevers have a common fixed end 30 for easy integration in current atomic force microscope systems.

Figure 6:
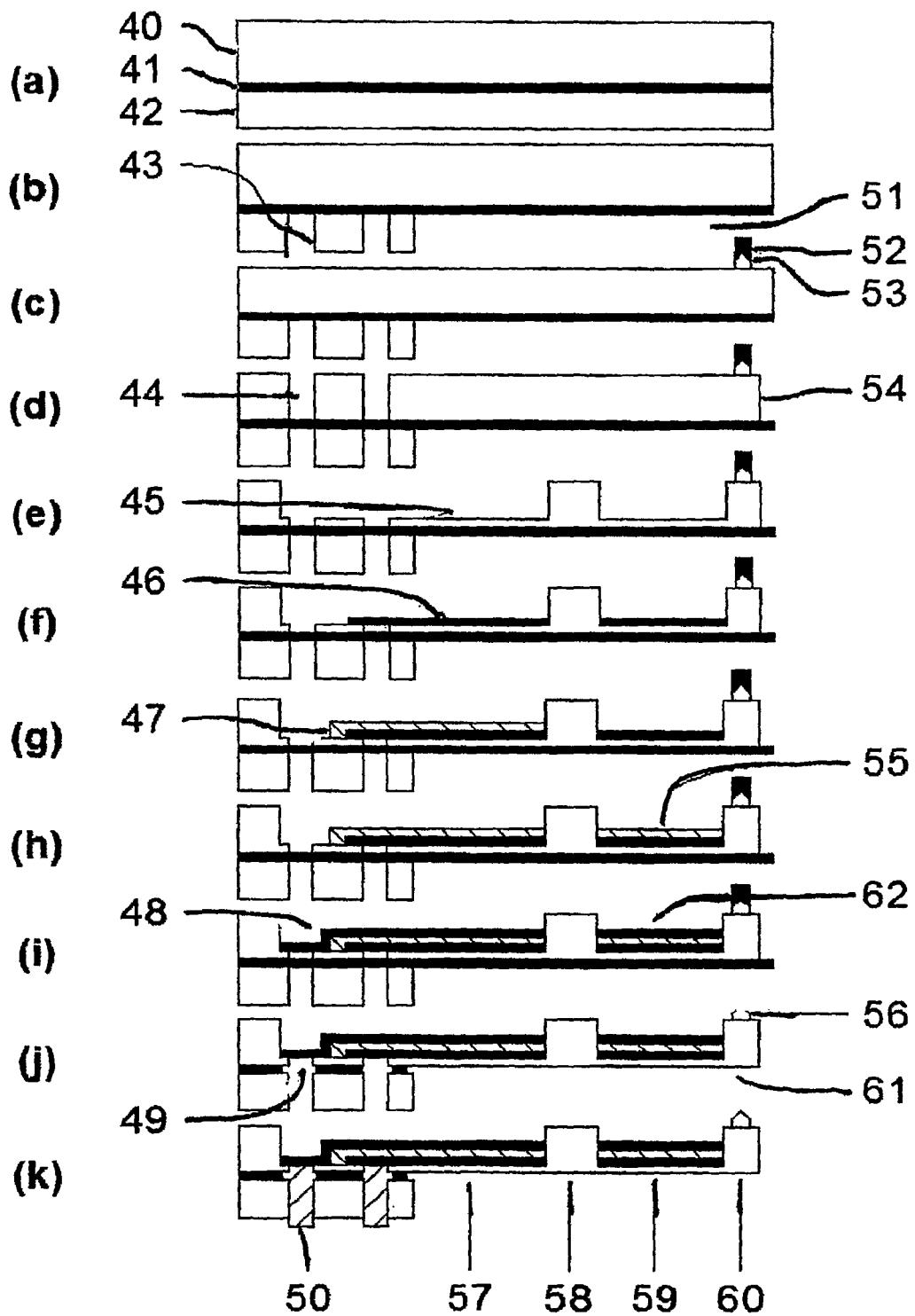
FIG. 6 illustrates a method of constructing the implementation of FIG. 5.

FIG. 6 summarizes fabrication of the embodiment of FIG. 5 in cross sections. A silicon-on-insulator (SOI) wafer, shown at FIG. 6(a), with two Silicon layers 40, 42 and a buried oxide layer 41 is first patterned, at FIG. 6(b) and etched from the back side to preform access holes 51 for the laser sensor of the atomic force microscope in one embodiment and holes for through wafer contacts (via) 43 in another embodiment. Another advantage of the backside etch at 51 is less damping in the system, which leads to higher mechanical amplification of the sensor oscillator.

During the second step, at FIG. 6(c), atomically sharp tips 53 and protective Silicon Dioxide caps 52 are formed on the front side by thermal oxidation of small patterned Silicon pillars, followed by a deep reactive ion etch to form pillars for the tips to stand on.

As shown at FIG. 6(d), the front side is then patterned and etched down to the buried oxide to both form the overall contour 54 of the sensor as well as the vias 44 from the front side. In a next step, at FIG. 6(e), the springs 45 of the system are etched into the Silicon.

The sensor can be actuated on the chip. For this purpose, a metal electrode 46 is deposited on the actuator by a liftoff process, at FIG. 6(f), followed by a piezoelectric layer deposition and etch to form a piezoelectric actuator 47, at FIG. 6(g), a piezoelectric sensor 55, at FIG. 6(h), and a top electrode 48 by another liftoff process, at FIG. 6(i).

In a next step, at FIG. 6(j), a BHF etch is performed. This etch removes the tip oxide therefore exposing the atomically sharp tip 56, and the buried oxide layer resulting in a release 61 of the device and the completion of the vias 49. In one embodiment, at FIG. 6(k), the vias are filled with solder 50 to provide the capability of back-side contacts in a final step.

Where the system consists of the above mentioned layers, the different mechanical components can be tuned in the following way without the necessity of a new set of masks: The masses of the actuator and the sensor cantilevers can be influenced by varying the depth of the etch step as depicted in FIG. 6(c). All spring constants can be influenced together by varying the depth of the etch step as depicted in FIG. 6(e) or the thickness of the electrode layers as depicted in FIG. 6(f) and FIG. 6(i). The spring constant of the actuation mass spring system can be influenced by the thickness of the deposition of the piezoelectric material described in FIG. 6(h). The spring constant of the sensor mass spring system can be influenced by the thickness of the deposition of the piezoelectric material described in FIG. 6(g).

The final structure now consists of an indentation mass 60, an actuation mass 58 and several springs 57, 59, partially comprising of a stack of Silicon, metal electrodes and a piezoelectric material.

Figure 7:
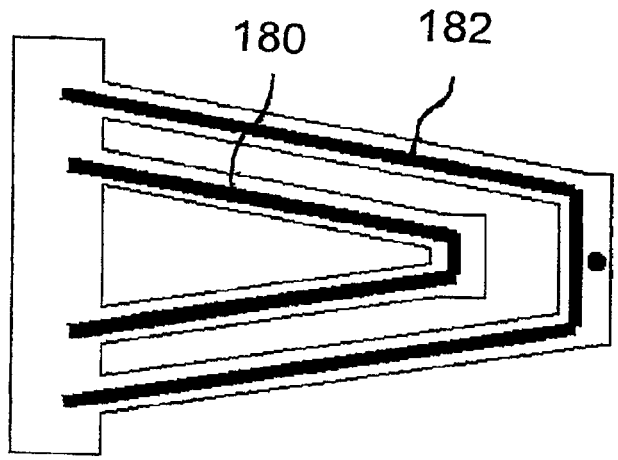
FIG. 7 illustrates an implementation in which the actuator and sensor arms are electrostatically coupled.

Another embodiment of the preferred geometry is shown in FIG. 7, an implementation in which energy transfer between the actuation/indentation oscillator arm and the sensor oscillator arm is achieved electrostatically by incorporating an electric bias between the two oscillators. For example, the oscillators can be electrostatically coupled with electrodes 180 and 182 formed on the surface of the oscillator arms, with leads to an electrostatic coupling force between the two electrodes. In one embodiment these electrodes can also serve as one of the electrodes for piezoelectric layers for piezoelectric actuation and/or sensing.

Figure 8:
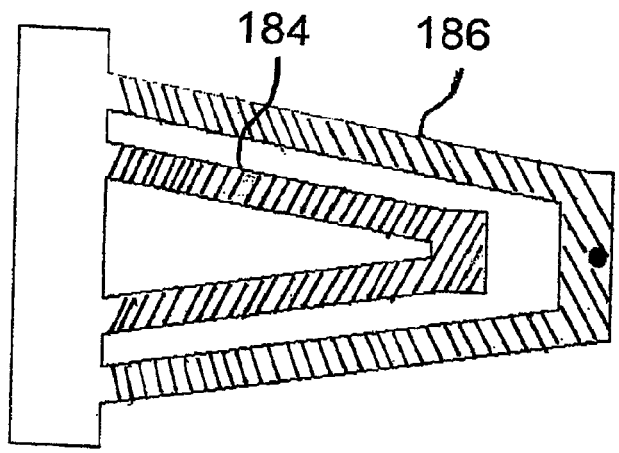
FIG. 8 illustrates an implementation in which the actuator and sensor arms are magnetically coupled.

Another embodiment of the preferred geometry is shown in FIG. 8, an implementation in which energy transfer between the actuation/indentation oscillator arm and the sensor oscillator arm is achieved magnetically, for example by applying a thin magnetic layer, respectively 184 and 186, to the surfaces of the two oscillators, for example by an electrodeposition and subsequent reactive ion etch. Depending on the magnetic orientation of these surfaces the two cantilevers will experience an attracting or repelling coupling force.

Figure 9:
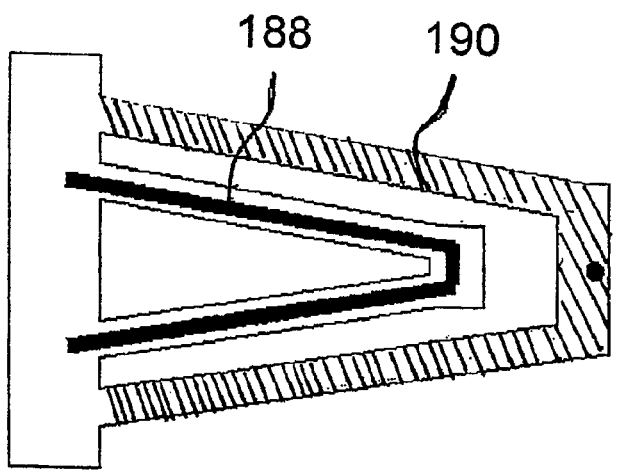
FIG. 9 illustrates an implementation in which the actuator and sensor arms are electromagnetically coupled

Another embodiment of the preferred geometry is shown in FIG. 9, an implementation in which energy transfer between the actuation/indentation oscillator arm and the sensor oscillator arm is achieved electromagnetically, for example by an electrode 188 inducing an electromagnetic field on the actuator and/or sensor oscillator arm and if applicable by applying a thin magnetic layer 190 to the remaining surfaces of the sensor/actuator oscillator without an electrode.

Figure 10:
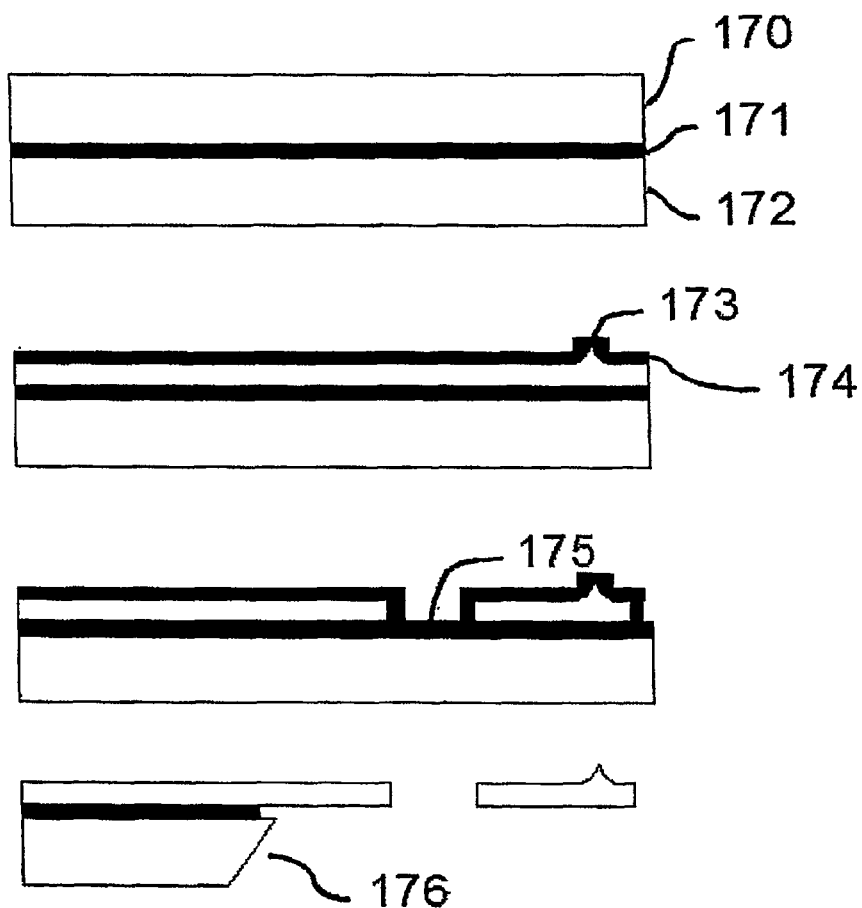
FIG. 10 illustrates a method of constructing the implementation of FIGS. 7, 8 and 9.

FIG. 10 illustrates a method of constructing the implementation of FIGS. 7 and 8. Fabricated can be accomplished with standard atomic force microscope probe fabrication methods. For example, the device can be fabricated out of a silicon on insulator wafer with a silicon device layer 170, an insulator 171 and a silicon handle layer 172. Initially the tip 173 would be etched, for example, sharpened by oxidation. After passivating 174 the tip, the overall contour of the sensor can be etched down to the oxide etch stop layer 175. Afterwards, the back side of the sensor can be patterned and etched 176, for example by a wet KOH etch. Finally the sensor can be released by an HF etch, which removes the oxide etch stop layer.

Alternative Embodiments

In a variation of the preferred embodiment, the movement of the sensor mass spring system can be read out with a laser beam as common on atomic force microscopes. In this variation, a torsional cantilever can be used for the sensor mass spring system providing a high quality factor. Optical detection schemes are well known and include beam deflection, for example to a segmented photodiode, and interferometry. Another detection scheme uses a piezoresistive strain sensor embedded in the AFM cantilever. Other aspects of constructing and operating an atomic force microscope are well known. Reference can be made to:

U.S. Pat. No. 6,871,527—Measurement head for atomic force microscopy and other applications U.S. Pat. No. 6,649,902—Summing the output of an array of optical detector segments in an atomic force microscope U.S. Pat. No. 6,032,518—Scanning stylus atomic force microscope with cantilever tracking and optical access U.S. Pat. No. 5,825,020—Atomic force microscope for generating a small incident beam spot U.S. Pat. No. 5,714,682—Scanning stylus atomic force microscope with cantilever tracking and optical access U.S. Pat. No. 5,560,244—Scanning stylus atomic force microscope with cantilever tracking and optical access U.S. Pat. No. 5,463,897—Scanning stylus atomic force microscope with cantilever tracking and optical access RE34,489—Atomic force microscope with optional replaceable fluid cell U.S. Pat. No. 4,800,274—High resolution atomic force microscope The disclosures of all the foregoing patents are hereby incorporated herein by reference.

Figure 2:
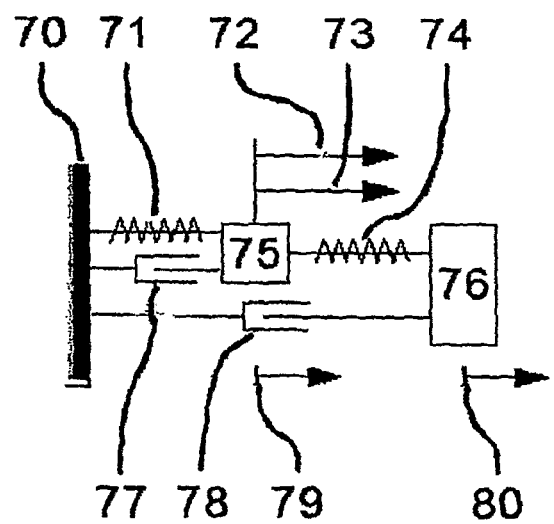

The function of another embodiment of this invention is summarized in FIG. 2. The actuation cantilever can again be modelled as a damped 77 mass 75 spring 71 system with a fixed end 70 and a free end 75. This cantilever is excited by the periodic actuation force 72 at a frequency on or near one of the submultiples of the sensor mass spring systems, which is not necessarily its own resonant frequency. Additionally, the tip-sample interaction occurs at mass 75, which can also be modelled as a periodic force 73. The movement of this dynamic system can be expressed with a time dependent coordinate 79. As the interaction forces are nonlinear and time dependent, the movement of the actuation cantilever is not only governed by the actuation signal but also by higher harmonics. The energy of the higher harmonics is mechanically amplified by another damped 78 mass 76 spring 74 system as the sensor. In contrast to the embodiment described in FIG. 1, this embodiment has no coupling spring and the sensor mass spring system is directly connected to the actuator. This embodiment does not suppress the movement of the actuator in absolute coordinates 80 but only in relative coordinates with respect to the actuator mass-spring system. Therefore this sensor has its maximum performance with on-chip-sensors as described in the dedicated section of this invention. On the other hand, less energy is dissipated from the mass 74 through the springs.

In a variation of this embodiment, more than one sensor mass spring system of the type (74, 76, 78) can be attached to the actuator providing a simultaneous measurement of more than one higher harmonic at one time.

This embodiment can be fabricated with the same steps described in the section about the fabrication of the preferred embodiment.

Figure 3:
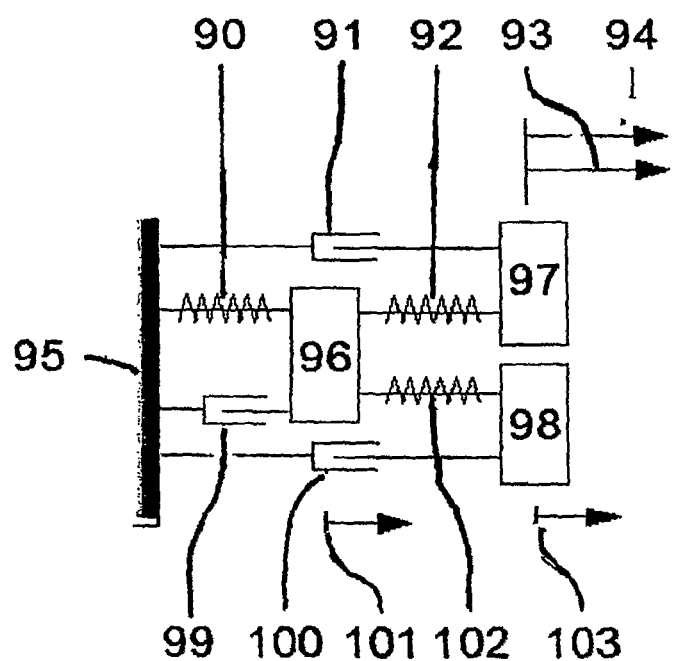

In another embodiment, summarized in FIG. 3, a damped 99 coupling mass 96 spring 90 system, which is fixed on one side 95, and free on the other side 96, serves as the coupler between the damped 91 actuation mass 97 spring 92 system and one or more damped 100 sensor mass 98 spring 102 systems. The coupling mass spring system shall have a much higher resonant frequency than the highest resonant frequency of a sensor mass spring system. In this case, the coupling mass spring system can serve as an energy transfer station between the actuator and the resonators. The actuation mass is actuated by an periodic actuation force 94 at a submultiple of the sensor mass spring system's resonant frequencies, which is not necessarily its own resonant frequency; and experiences the indentation forces 93 through its mounted tip. The sensor mass spring systems mechanically amplify the energy of the higher harmonics transmitted through the coupling mass-spring system.

This embodiment can be fabricated with the same steps described in the section about the fabrication of the preferred embodiment.

Figure 11:
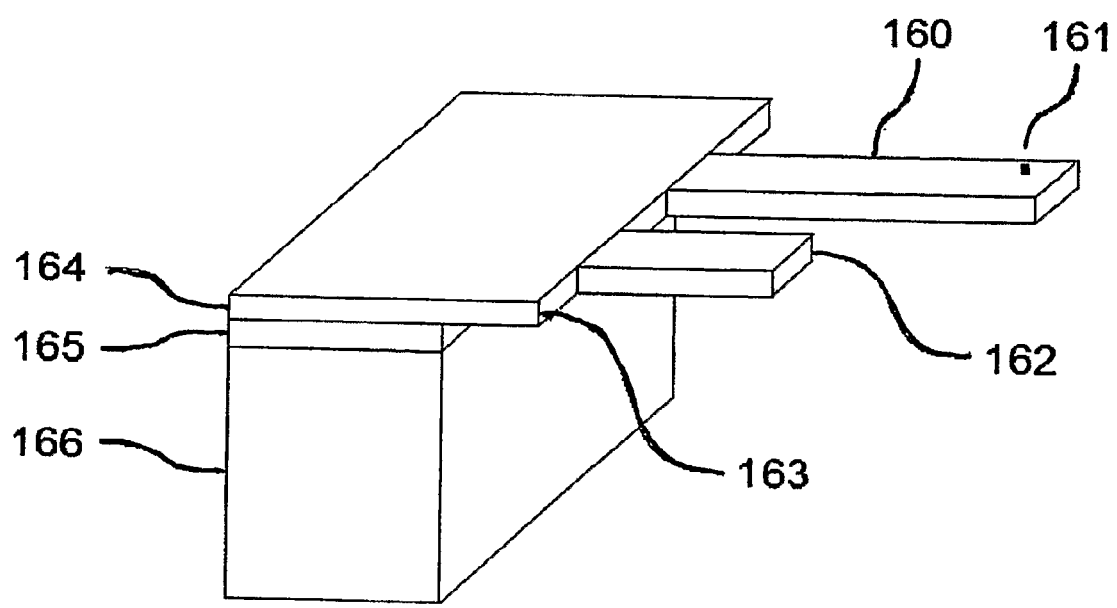
FIG. 11 illustrates an implementation of an alternate embodiment.

One implementation of this embodiment is described in FIG. 11 and consists of one actuation cantilever 160 with the indentation tip 161, and the sensor cantilever 162. Both cantilevers are coupled through the coupling mass spring system 163, which consists of an etched undercut with a high quality factor and a resonant frequency. The wafer consists of a device silicon layer 164, a buried oxide layer 165 and a silicon handling wafer 166.

Figure 4:
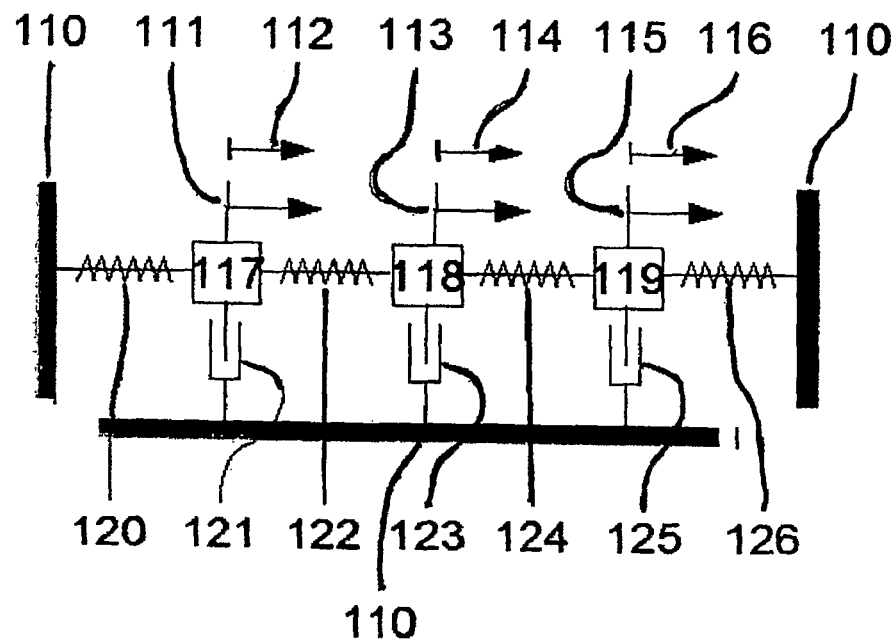

In another embodiment of this invention, as summarized in FIG. 4, the actuation mass 117 and indentation mass 118 can be separated: The damped 121 actuation mass 117 spring 120 system is actuated displacement 112 controlled by the actuation force 111 at a frequency which is a or close to a submultiple of the sensor resonance frequencies, but not necessarily its own resonant frequency. A damped 123 indentation mass 118 spring 122 system is attached to the actuator mass spring system. The indentation mass spring system shall have a much higher resonant frequency than the highest sensor mass spring system. One or more damped 125 sensor mass 119 spring 126 systems with one fixed end 110 and one free end 119 are connected to the indentation mass 118 with a coupling spring 124. They mechanically amplify the desired higher harmonics of the periodic indentation 114.

Both implementations can be fabricated with the same steps described in the section about the fabrication of the preferred embodiment.

In a variation of this embodiment, the actuator mass spring system can serve as a common actuator for more than one indentation mass-spring systems, providing an easy means of synchronization of signals.

Arrangement of Sensors

Figure 12:
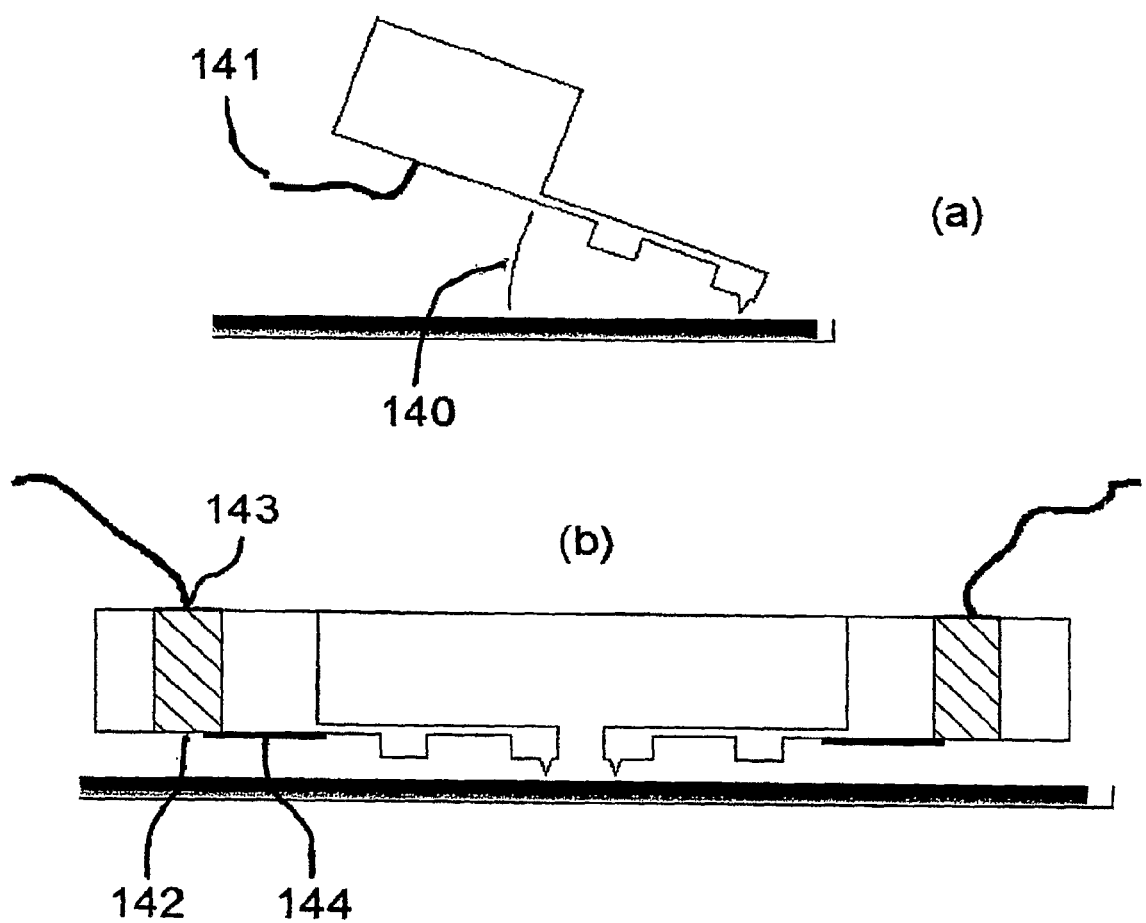
FIG. 12 shows the principles of line and array architectures with the preferred embodiment.

One variance of the embodiments is described in FIG. 13. Several sensors 131 of any type of the previously described embodiments can be fabricated at once to form a line of sensors 132. This line can be integrated in current mechanical atomic force microscope interfaces and allow fast simultaneous measurements, however, due to the more difficult optical alignment, an on-chip sensing method, for example with piezoelectric or piezoresistive on-chip sensors as described above is preferred. A line of sensors also needs a strong compensation for tilting in one direction to ensure equal performance on each individual sensor head. A line of sensors can be angled 140 and wirebonded 141 from the front surface as described in FIG. 12.

In this embodiment, the sensors can be aligned in the following way: All sensors in the line are driven at its desired excitation frequency while the sensor is being lowered to the sample surface. At the moment when the first sensor establishes contact with the sample surface, its sensor mass spring system starts to detect the contact. From this moment the opposite side of the sensor can be lowered while keeping the point of first contact at equal height.

Another variance of the embodiments is described in FIG. 13. Several lines of sensors 132 can be arranged in an array of any shape of sensors 132 thus increasing the performance even more. In this case, tilting alignment along two axises is necessary. Additionally, a two dimensional array of sensors can no longer be angled and wirebonded from the front surface but needs via 142 for back side contacts 143 or direct electronics 144 on the front side as described in FIG. 13.

In this embodiment, the sensors can be aligned in the following way: All sensors in the array are driven at its desired excitation frequency while the sensor is being lowered to the sample surface. At the moment when the first sensor establishes contact with the sample surface, its sensor mass spring system starts to detect the contact. From this moment the opposite side of the sensor can be lowered while keeping the point of first contact at equal height. As soon as a line of sensors established contact, the sensor can be lowered in another point perpendicular to this line of sensors until a third contact has been established and an array of sensors in contact has been established.

REFERENCES

The following publications are hereby incorporated by reference.

1. G. Binnig, C. F. Quate, Ch. Gerber: *Atomic Force Microscopy*, Physical Review Letters, Vol. 56, No. 9, pp. 930 (1986).
2. J. Tamayo, R. García: *Deformation, Contact Time, and Phase Contrast in Tapping Mode Scanning Force Microscopy*, Langmuir 12, pp. 4430 (1996).
3. E. K. Dimitriadis, F. Horkay, J. Maresca, B. Kachar, R. S. Chadwick: *Determination of Elastic Moduli of Thin Layers of Soft Material Using the Atomic Force Microscope*, Biophysical Journal, Vol. 82, pp. 2798 (2002).
4. O. Sahin, C. F. Quate, O. Solgaard, A. Atalar: *Resonant Harmonic Response in Tapping-Mode Atomic Force Microscopy*, Physical Review 1369, 165416 (2004). See also, U.S. Pat. No. 6,935,167 to Sahlin et al. Titled: Harmonic Cantilevers and Imaging methods for Atomic Force Microscopy.
5. O. Sahin, G. Yaralioglu, R. Grow, S. F. Zappe, A. Atalar, C. Quate, O. Solgaard: *High-Resolution Imaging of Elastic Properties Using Harmonic Cantilevers*, Sensors and Actuators A 114, pp. 183 (2004).
6. M. Balantekin, A. Atalar: *Enhancing Higher Harmonics of a Tapping Cantilever by Excitation at a Submultiple of its Resonance Frequency*, Physical Review B71, 125416 (2005).
7. R Bashir, A. Gupta, G W Neudeck, M McElfresh, R Gomez: *On the Design of Piezoresistive Silicon Cantilevers with Stress Concentration Regions for Scanning Probe Microscopy Applications*, J. Micromech. Microeng. Vol. 10, pp. 483 (2000).
8. R. Baskaran, K. L. Turner: *Mechanical Domain Non-Degenerate Parametric Resonance in Torsional Mode Micro Electro Mechanical Oscillator*, Transducers '03, Boston, pp. 863 (2003).

The invention claimed is:

1. A coupled mass-spring system for use as a scanning probe microscope, comprising:
one or more oscillators including an actuator oscillator;
a probe on the actuator oscillator for contacting a sample; and
a non-probe sensor oscillator coupled to the probe-hearing oscillator for transfer of energy between the sensor oscillator and the probe-bearing oscillator, the sensor oscillator being spaced from the probe-bearing oscillator so as to be out of direct contact with the sample and with the probe-bearing oscillator at all times during said transfer of energy, the mass-spring system being capable of mechanical amplification of a desired frequency in the sensor oscillator upon displacement of the actuator oscillator to thereby improve the sensitivity and measurement range of the scanning probe microscope.

2. The coupled mass-spring system of claim 1 in which the probe-bearing oscillator is an indentation oscillator.

3. The coupled mass-spring system of claim 1 in which the probe-bearing oscillator is the actuator, which serves as an actuator/indentation oscillator.

4. The coupled mass-spring system of claim 1 in which the sensor oscillator and the probe-bearing oscillator are (a) coupled by a mechanical spring, (b) electrostatically coupled, or (c) magnetically coupled.

5. The coupled mass-spring system of claim 4 in which the sensor oscillator and the probe-bearing oscillator are electrostatically coupled and including electrodes on the sensor oscillator and the probe-bearing oscillator connectible to an electric current to provide the electrostatic coupling.

6. The coupled mass-spring system of claim 4 in which the sensor oscillator and the probe-bearing oscillator are magnetically coupled and including a magnetic coating on one of the sensor oscillator and the probe-bearing oscillator and an electrode on the other oscillator connectable to an electric current to provide electromagnetic coupling.

7. The coupled mass-spring system of claim 1 wherein the actuation oscillator is actuatable at a submultiple of one of the sensing oscillator's resonant frequencies.

8. The coupled mass-spring system of claim 1 wherein the sensor oscillator is tunable to integer multiples of the frequency of oscillation of the actuator oscillator to mechanically amplify one or more higher harmonics of the actuator oscillator frequency.

9. The coupled mass-spring system of claim 1 in which the probe-bearing oscillator has a free and a fixed end with the tip of the probe projecting near the free end thereof, and the sensing oscillator has a free and a fixed end.

10. The coupled mass-spring system of claim 9 in which the fixed end of the sensing oscillator is on the fixed end of the probe-bearing oscillator.

11. The coupled mass-spring system of claim 1 in which the coupling mass spring system is on a chip and realized by an etch undercut for higher quality factors.

12. The coupled mass-spring system of claim 1 in which the coupling mass spring system is on a chip realized by a torsional spring for higher quality factors.

13. The coupled mass-spring system of claim 1 in which:
the actuation oscillator has a fixed end and an actuated displacement controlled free end;
the probe-bearing oscillator is an indentation oscillator with one end at the actuation oscillator's free end and one free end, with the tip of the probe projecting at the free end to allow an elastic reaction to a tip-surface contact; and
the sensing oscillator having a fixed end and the other end at the indentation oscillator, mechanically amplifying one or more higher harmonics of the frequency of oscillation of the actuator oscillator.

14. The coupled mass-spring system of claim 13 in which there is more than one indentation oscillators, each having an actuation oscillator serving as its actuation source.

15. The coupled mass-spring system of claim 1 in which:
the actuation oscillator has a fixed end and an actuated displacement controlled free end;
the probe-bearing oscillator is an indentation oscillator with one end at the actuation oscillator's free end and one free end, with the tip of the probe projecting at the free end to allow an elastic reaction to a tip-surface contact; and
the sensing oscillator has one end on the probe end of the indentation oscillator, a free end of the sensing oscillator mechanically amplifying one or more higher harmonics of the frequency of oscillation of the actuator oscillator.

16. The coupled mass-spring system of claim 1, wherein the mass-spring systems comprise a material selected from the group of silicon, silicon nitride, titanium.

17. The coupled mass-spring system of claim 1, wherein the actuator oscillator forms a bimorph containing two materials with a highly different piezoelectric constant and two electrodes on the top and the bottom serving as a piezoelectric drive, or a bimorph containing a substrate, an electrode, a piezoelectric layer and another electrode.

18. The coupled mass-spring system of claim 17, wherein the resonant frequency of the actuator oscillator can be tuned in accordance with the layer thicknesses of the bimorph.

19. The coupled mass-spring system of claim 1, wherein the sensing oscillator forms a bimorph containing two materials with a highly different piezoelectric constant and two electrodes on the top and the bottom serving as a piezoelectric on-chip sensor, or a bimorph containing a substrate, an electrode, a piezoelectric layer and another electrode.

20. The coupled mass-spring system of claim 19, wherein the resonant frequency of the sensor oscillator can be tuned in accordance with the layer thickness of the bimorph.

21. The coupled mass-spring system of claim 1 embedded in a line of sensors with independent actuators and on-chip sensors.

22. The coupled mass-spring system of claim 1 embedded as an array of sensors with independent actuators and on-chip sensors.

23. A coupled mass-spring system for use as a scanning probe microscope, comprising: one or more oscillators including an actuator oscillator; a probe on one of the oscillators for contacting a sample; and a sensor oscillator spaced from the probe-bearing oscillator and magnetically coupled to the probe-bearing oscillator for transfer of energy between the sensor oscillator and the probe-bearing oscillator, and including respective magnetic coatings of opposite polarity on confronting surfaces of the oscillators to provide the magnetic coupling, whereby to enable mechanical amplification of a desired frequency in the sensor oscillator to improve the sensitivity and measurement range of the scanning probe microscope.

24. A coupled mass-spring system for use as a scanning probe microscope, comprising:
   one or more oscillators including an actuator oscillator;
   a probe on the actuator oscillator for contacting a sample; and
   a sensor oscillator coupled to the probe-bearing oscillator by a mechanical torsional spring for low damping for transfer of energy between the sensor oscillator and the probe-bearing oscillator, the sensor oscillator being spaced from the probe-bearing oscillator so as to be out of direct contact with the probe-bearing oscillator at all times during said transfer of energy, the mass-spring system being capable of mechanical amplification of a desired frequency in the sensor oscillator to thereby improve the sensitivity and measurement range of the scanning probe microscope.

25. A method for operating a scanning probe microscope, comprising:
   providing one or more oscillators including an actuator oscillator;
   providing a probe on the actuator oscillator for contacting a sample;
   providing a sensor oscillator coupled to the probe-bearing oscillator for transfer of energy between the sensor oscillator and the probe-bearing oscillator, the sensor oscillator being spaced from the probe-bearing oscillator so as to be out of direct contact with the probe-bearing oscillator at all times during said transfer of energy; and
   displacement controlling the actuator oscillator whereby a desired frequency in the sensor oscillator is mechanically amplified to improve the sensitivity and measurement range of the scanning probe microscope.

26. The method of claim 25 in which the sensor oscillator and the probe-bearing oscillator include electrodes, the method including connecting the electrodes to an electric current to provide electrostatic coupling between the sensor oscillator and the probe-bearing oscillator.

27. The method of claim 25 in which one of the sensor oscillator and the probe-bearing oscillator has a magnetic coating and the other oscillator has an electrode thereon, the method including connecting the electrode to an electric current to provide electromagnetic coupling.

28. The method of claim 25, comprising actuating the actuation oscillator at a submultiple of the sensing oscillator's resonant frequency.

29. The method of claim 25, comprising tuning the sensor oscillator to an integer multiple of the frequency of oscillation of the actuator oscillator to mechanically amplify one or more higher harmonics of the actuator oscillator frequency.

30. The method of claim 25, comprising tuning and driving the actuation oscillator at or close to one of its resonant frequencies.

31. The method of claim 25, comprising driving the actuation oscillator at a frequency substantially different from its resonant frequency, therefore requiring more actuation force to achieve the same amplitude and therefore providing higher indentation forces and higher robustness against fabrication tolerances.

32. The method of claim 25 in which the components are embedded in a line of sensors with independent actuators and on-chip sensors and including the steps of periodically actuating the sensor oscillator and aligning the system by lowering the periodically actuated sensor until a first contact is established and lowering a point on the other side of the sensor line while maintaining the position of the first point of contact until a contact of the line of sensors is established.

33. The method of claim 25 in which the components are embedded as an array of sensors with independent actuators and on-chip sensors and including the steps of periodically activating the sensor oscillator and aligning the system in two directions of tilting by lowering the periodically actuated sensor until a first contact has been established, then lowering a second point on one other side of the sensor array while maintaining the position of the first point of contact until a line of contacts has been established and then by towering a third point on yet another side of the sensor array while maintaining the position of the first line of contact until an area of contacts has been established.

* * * * *